United States Patent [19]

Downes, Jr. et al.

[11] Patent Number: 5,052,801
[45] Date of Patent: Oct. 1, 1991

[54] COMPACT LASER-ASSISTED WEAPON SIGHT

[75] Inventors: George R. Downes, Jr., Orlando; Peter T. Dorman, Mt. Dora, both of Fla.

[73] Assignee: Damocles Engineering, Inc., Orlando, Fla.

[21] Appl. No.: 452,303

[22] Filed: Dec. 19, 1989

[51] Int. Cl.$^5$ .............................................. F41G 1/35
[52] U.S. Cl. ..................................... 356/153; 33/241; 356/251
[58] Field of Search ................ 356/138, 153, 251–255; 362/110; 33/233, 234, 241, 245

[56] References Cited

U.S. PATENT DOCUMENTS 3,627,429 12/1971 Jaenicke et al. ..................... 356/153

FOREIGN PATENT DOCUMENTS 3234289 3/1984 Fed. Rep. of Germany ........ 33/241
1378852 12/1974 United Kingdom ................ 356/255

Primary Examiner—F. L. Evans
Attorney, Agent, or Firm—Edward M. Livingston

[57] ABSTRACT

A weapon sight assembly comprising a combined telescope 2 and laser unit 1 through which the user can view both a target and a laser light spot generated by the laser unit 1 on a target at the same time. A rhomb assembly housing 6 to direct the laser light into the side of the telescope 2 behind the objective lens 3 of the telescope 2. The emitted laser light beam is reflected by means of the rhomb assembly 6, which combines the laser light with the optical axis 22 of the sighting telescope 2, thereby eliminating the problem of parallax between the optical axis of the telescope and the emitted laser light beam. The entire weapon sight assembly is then mounted in a ring base attached to the weapon, said ring base being fully adjustable for windage and elevation.

8 Claims, 3 Drawing Sheets

COMPACT LASER-ASSISTED WEAPON SIGHT

BACKGROUND OF THE INVENTION

This invention relates to sighting devices for weapon systems and more particularly to laser-assisted sights for bore-sighted weapons.

Heretofore, weapon sights have consisted of primarily straight optical telescopic sights with crosshairs. Recently there have also been some telescopic weapon sights that do use lasers. However, the use of a telescopic aiming device combined with a laser aiming spot as a weapon sight has been very limited. Such units have required complex optics, expensive lasers and bulky battery packs. Also, constant servicing was required to keep the optics aligned and the lasers functioning. Thus, every day usage was impractical and very limited.

The prior art includes some weapon sights that do use lasers, such as U.S. Pat. Nos. 4,266,873 by Hacskaylo, et al., 3,464,770 by Schmidt, 3,803,399 by Smith, et al., and 3,867,764 by Dunmire, et al.

In Hacskaylo an infrared light source is directed by movable mirrors through sighting optics along a portion of the optical axis. In Schmidt a weapon sight has a laser range finder in which the laser beam is passed through its own set of lenses and directed to the target. Smith shows a target illuminator using a separate mountable laser. In Dunmire a separate aiming light is connected to a weapon sight for illuminating the target. Although these aforereferenced patents teach the use of lasers in conjunction with weapon sights, a major problem is that none of the weapon sights makes the axis of the optical sight truly collinear with the axis of the emitted laser beam so as to eliminate parallax between the two beams or provides inherent bore-sight stability.

In the present invention, a solid, fixed-mount rhomb lens assembly centered inside a housing behind the objective lens eliminates the parallax problem between the scope optics and the emitted laser beam. The effect of this novel feature is to insure a precise predictable point of impact when firing at a target. Moreover, this sight assembly method allows various light sources to be used, such as a HeNe laser, a laser diode, or light emitting diode ("LED").

The present weapon sight also allows a simple, precise sighting alignment for bore-sighting the weapon. The sighting telescope is aligned to the laser spot be means of reticle adjustments on the telescope. This can be accomplished by visual alignment against a suitable target or using optical instrumentation. The laser-telescope assembly is then bore-sighted to the weapon or other device. In the case of a weapon, a round is fired at a target located at the range designed for bore-sight (usually determined by the balistics of the weapon). The laser-telescope assembly is then bore-sighted to the point of impact by means of standard mounts which provide azimuth and elevation adjustment for the assembly. Bore-sighting to different ranges requires a simple elevation adjustment of the mount, so that the laser-telescope alignment does not need to be changed.

SUMMARY OF THE INVENTION

The primary object of the present invention is to provide a laser-assisted telescopic weapon sight which yields improved accuracy of shooting by eliminating the parallax problem between scope optics and the emitted laser beam.

A second object of the present invention is to provide such a weapon sight that is compact enough so as to be used on most all weapons.

Another object of the present invention is to provide such a weapon sight which needs very little servicing to maintain the alignment of the optics.

A further object is to provide such a weapon sight which enables easy and more precise alignment of the optics and laser for bore-sighting the weapon.

An even further object is to provide a weapon sight for use by various persons, such as law enforcement officials, wherein the intimidation factor of a smaller, more intense laser spot at greater range may preclude the necessity of firing a weapon.

An additional object of the present invention is to provide a sight assembly method that affords the use of various and diverse laser systems thereby allowing expanded use of the sight in non-weapon application.

A corollary object of the present invention is to provide such a sight assembly which is easy to use since it interfaces very well with the operator.

The present invention accomplishes the above and other objects by providing a laser-assisted weapon site apparatus comprising a combination of an optical telescope and a laser light source which is attached to the telescope by an objective housing inserted into the side of the telescope before the objective lens of the telescope. This objective housing, which connects the laser light source to the telescope, contains a means of transferring the light emitted from the laser light source into the telescope and aligning same with the longitudinal optical axis of the telescope for transmission out the objective lens of the telescope.

The means of transferring the light beam and aligning it with the optical axis of the telescope may consist of a stable rhomb mirror assembly having a mirror in front of the laser light source which is angled so as to reflect the light beam emitted from the laser light source to a second mirror in the housing. Said second mirror is positioned in the telescope, and angled to allow the reflection of the laser light beam along said optical axis and out the objective lens of the telescope to a target.

Another means of transferring the laser light beam from the source to the telescope may consist of an optical fiber which will extend from the laser light source to the longitudinal optical axis of the telescope.

As described herein the present invention is battery-powered for more flexible use. A remote switch is provided so as to turn off the power to conserve the life of the batteries when the laser is not in operation.

Other objects, advantages and features of the invention will become even more readily apparent from the following detailed description of the specific embodiments thereof when read in conjunction with the accompanying drawings.

BRIEF DESCRIPTION OF THE DRAWINGS

The drawings appended hereto which are used in conjunction with discussing the preferred embodiments of the invention are as follows.

DESCRIPTION OF THE PREFERRED EMBODIMENTS

Figure 1:
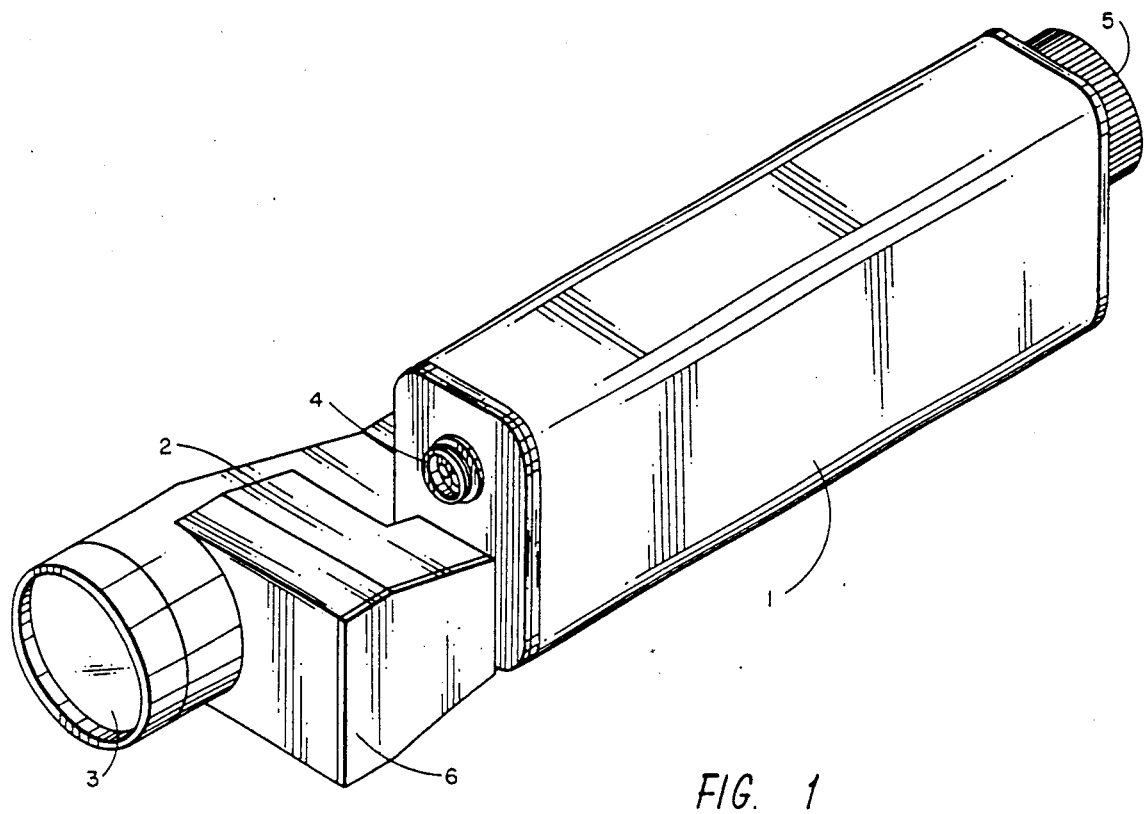
FIG. 1 is a perspective view of the invention.
Figure 2:
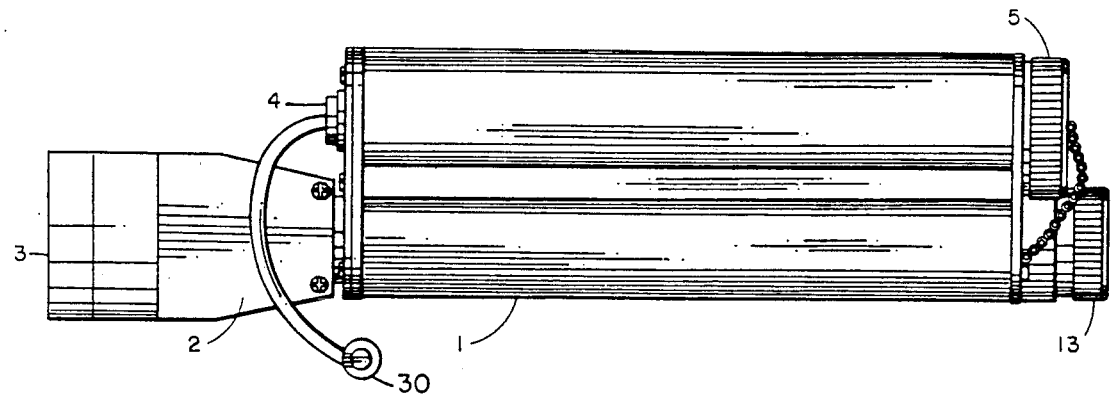
FIG. 2 is a side view of the present invention.

Referring to the drawings, FIGS. 1 and 2 show the present invention being comprised of an optical telescope 2 and a laser unit 1 which are connected to each other by a housing 6. The telescope 2 contains an objective lens 3 through which a target is viewed. Other features shown in FIGS. 1 and 2 include a connector 4 for connecting a remotely located laser activator switch (not shown) and battery compartment cover 5 at the rear of the laser unit 1.

Figure 3:
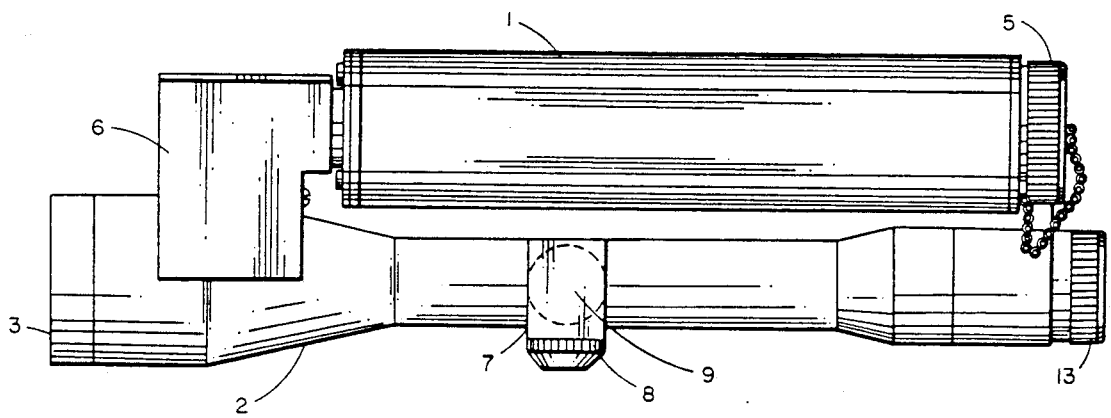
FIG. 3 is a bottom view of the present invention.

FIG. 3, in addition to the above described external components of the device, shows the telescope reticle adjustment 7. The reticle adjustment 7 has two adjustment mechanisms, one being an elevation adjustment 8 that can be adjusted for the desired elevation, and a second adjustment 9 for adjusting the azimuth of the sight to accommodate varying windage conditions.

Figure 4:
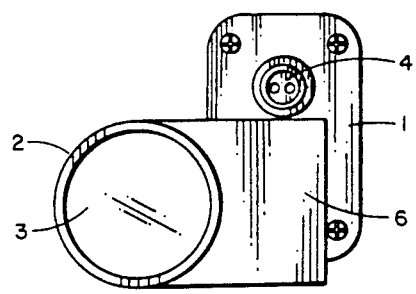
FIG. 4 is a front view of the present invention.

FIG. 4 shows the same previously-described components as same would appear looking at the sight assembly from the front end thereof.

Figure 5:
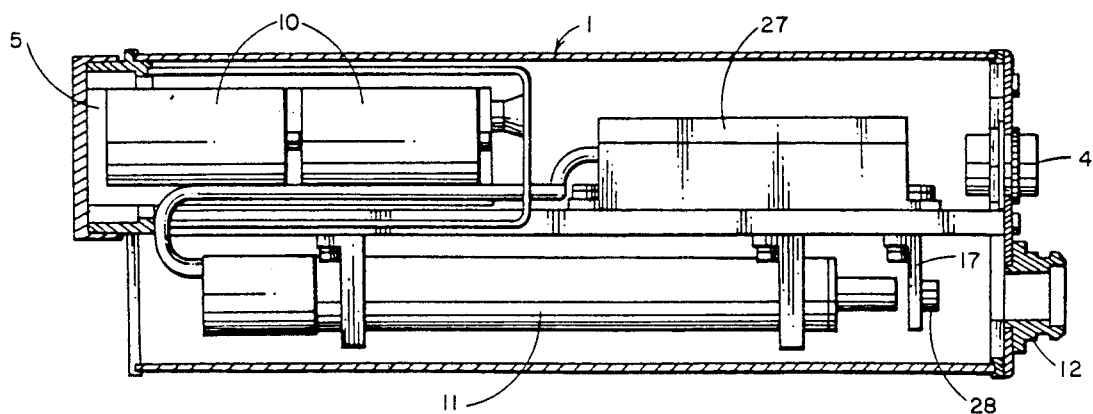
FIG. 5 is a partial cross-sectional view of the laser unit portion of the invention showing the internal components.

In FIG. 5 the internal components of the laser unit 1 are shown generally. The top portion of the laser unit 1 contains the power supply 27 of the laser unit and batteries 10. These batteries 10 supply power to the laser light source 11. The laser light source 11 projects a light beam through the center of the optical connector 12, said connector being attached to the rear of the housing 6.

Figure 6:
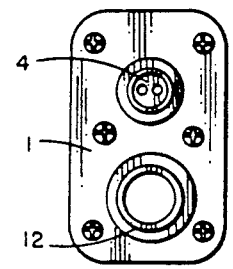
FIG. 6 is a front view of the laser unit portion of the invention.

FIG. 6 shows a front view of the laser unit 1 showing the housing optical connector 12 and remote laser activator switch connector 4.

Figure 7:
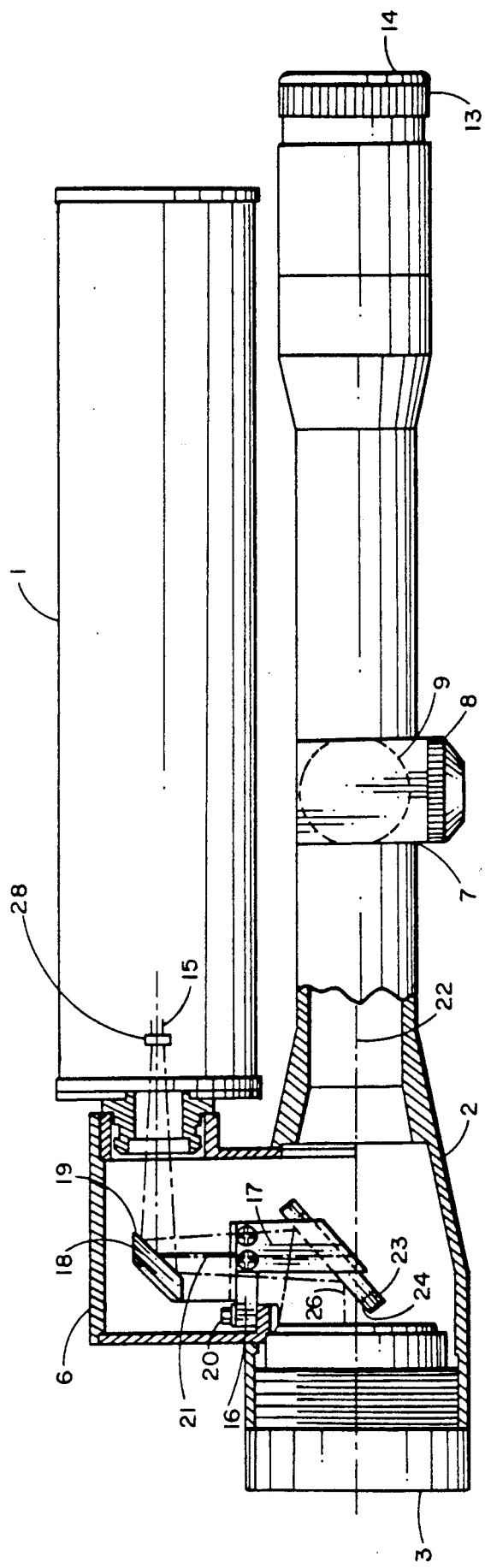
FIG. 7 is a bottom plan view of the invention showing the internal optics of the invention.

The operation of the device can best be described with reference to FIG. 7 which shows the internal components of the invention. As previously described, the entire weapon sight assembly comprises two major components, the optical telescopic sight 2 and the laser unit 1 which are connected to each other by the housing 6. As shown, the light beam 15 emitted by the laser 1 is directed to the selected target by means of rhomb mirrors 18 and 23 contained in the housing 6, said rhomb mirrors being connected to the housing 6 by rhomb attachment bracket 20. In order to eliminate parallax between the laser light beam 15, which is originally emitted from the laser light source 11, and the optical sight axis 22 of the telescope 2, the sight assembly has been designed so that said laser light beam and the optical sight axis 22 can be made collinear after the beam passes through the objective lens 3 of the optical sight 2 to a target. This arrangement provides for exact bore-sight between the two paths at all ranges.

In order to control the collimation of the emitted laser light beam, essentially a functionally separate collimating telescope is employed comprised of two lens— one a lens 28 (see FIG. 5) in front of the laser light beam 15 emitted from the laser light source 11 and a second lens 3 provided by the sighting telescope 2. The rhomb mirrors A and B, 18 and 23, respectively, fold the laser light to be directed through the objective lens 3 of the telescope 2 along the same optical path as the sighting telescope 2.

The joint use of the objective lens 3 for the aforementioned purposes has several advantages. It eliminates the requirement for an additional lens as is used in the prior art devices, which in turn reduces cost and permits combining the optical paths of the laser and telescopic scope 2 at a point where the laser light beam diameter is small. Finally, it improves bore-sight retention since there is one less lens that could become misaligned.

In order to maintain the bore-sight over the conditions which may be encountered, the laser light source 1 is rigidly attached to the optical sight 2. The output beam 15 of the laser light source 11 is folded into the optical sight 2 just behind the objective lens 3. As stated previously, this can be accomplished by means of the rhomb mirror assembly consisting of two mirrors A and B, 18 and 23, respectively. These two reflecting surfaces are maintained in a rigid assembly 16, such that the angular alignment between the said reflecting surfaces does not change. The optical properties of a rhomb are such that the two reflecting surfaces are maintained approximately parallel. In this manner the input light beam 15 and the emitted output light beam from the telescopic sight 2, although slightly laterally offset, will still be parallel even if the rhomb assembly is rotated over small angles. Thus, even a small angular misalignment of the rhomb assembly due to shock or other reasons will not affect the bore-sight between the two optical paths.

The rhomb assembly can be fabricated of solid optical elements using total internal reflection to affect the two reflecting surfaces or may be assembled from two "silvered" or dichroic mirrors. The use of a dichroic mirror at 23 which is coated for maximum reflection at the wave length of the light 15 emitted from the laser unit 1 and maximum transmission at the wave lengths normally used by the optical sight 2 provides the least interference within the sighting assembly.

As the emitted laser beam 26 enters the objective lens 3, it has the same divergence as would appear to result from a point source in the focal plane of the objective lens 3 so that the objective lens 3 can collimate the emitted laser light beam 26. This point is laterally offset by the rhomb mirror 23. The divergence of the beam 26 as it approaches the objective lens 3 is determined by the collimating telescope lens 28 located in front of and near the laser light source 11. When used with light sources that are nearly collimated, in other words, which have small divergences, the lens 28 will require a negative power to expand the beam 15 to match the divergence required by lens 3. With light sources having larger divergence, such as an optical fiber or light emitting diode (LED), a positive lens must be used to bring the light beam divergence 26 down to match the divergence of the objective lens 3.

The secondary lens 28 is mounted on an X-Y translation stage 17 enabling lateral movement of the secondary lens 28, which enables the reflected laser beam 21 to be bore-sighted to the optical sighting axis 22. When a fiber optic is used, an alternative arrangement would be to form a rigid assembly at the output end of the fiber and the secondary lens 28 wherein the secondary lens 28 is positioned to collect the light from the fiber and give it the proper divergence when transmitting it to the rhomb mirror 23. Another arrangement made possible by the flexible nature of optical fiber would be to carry the laser light directly to the objective lens 3, thereby eliminating need for a rhomb lens assembly altogether.

After having bore-sighted the laser and optical paths, the entire sight assembly is mounted to the weapon or other device such as survey equipment, by means of a standard adjustable mounting device (not shown) having elevation and azimuth adjustment mechanisms, such as those indicated by 8 and 9, respectively. These adjustments are used to bore sight the sight assembly to the weapon. The latter adjustment is normally made such that the axis of the optical sight 22 is directly above the firing line of the weapon. This eliminates lateral parallax between the weapon and the sight and permits the sight to compensate for ballistics in the case of a fired projectile.

In the usual situation the present device may be battery powered by batteries 10 stored in battery compartment 5 in the back of the laser unit 1. These batteries 10 are usually sized as small as consistent with the required operating time of the laser. To maximize operational battery life, a remote switch 30 as shown in FIG. 2 is connected by a cord to the connector 4 on the front of the laser unit 1 so that the operator can turn on the laser light only when required. Such a switch can automatically turn off the laser when the operator releases his finger on said switch. The switch is located by the operator's hand so that it could be activated without the operator having to remove his visual attention from the optical lens 14. Diopter adjustment of the telescope for individual eye accommodation would normally be adjustable by a rotatable telescopic sight adjustment 13.

As described in detail above, a useful new nonobvious laser-assisted sight assembly has been provided for weapons and other devices, which eliminates the parallax associated with prior devices. Also, the special design of the present apparatus makes it so compact that it can be easily mounted on almost any size of commercial or military weapon.

While specific embodiments of the invention have been described in detail hereinabove, it is to be understood that various modifications from the specific details are within the spirit and scope of the invention as set forth in the appended claims.

Having described my invention, I claim the following:

1. A laser-assisted sight apparatus comprising:

an optical telescope having an objective lens in an optical sight axis of the telescope and a housing attached to and inserted into the side of the telescope behind the objective lens of said telescope;
a laser light source attached to the side of said telescope by the housing; and
means in the housing for transferring the light emitted from the laser light source to the optical axis of the telescope for transmission through the objective lens of the telescope to a target comprising a rhomb mirror assembly mounted therein, said rhomb mirror assembly having a reflecting surface in front of the laser light source which is aligned such that it allows the laser light beam to be reflected along said optical axis through the objective lens of the telescope to a target toward which the telescope is aimed.

2. The apparatus of claim 1, wherein the laser light source comprises a diode laser.

3. The apparatus of claim 1, wherein the laser light source comprises a light emitting diode.

4. The apparatus of claim 1, wherein the laser light source is a helium neon laser.

5. The apparatus of claim 1, wherein the laser light source is battery powered.

6. The apparatus of claim 5 further comprising a remote operating switch connected to the laser light source which may be activated to turn on the laser light source as required and off when not in use in order to conserve battery power.

7. The apparatus of claim 1 wherein the reflecting surfaces in the rhomb mirror assembly are adjusted in relation to each other in order to bore-sight the light beam emitted from the laser light source to the optical sight axis of the telescope.

8. A method of bore sighting a weapon using the apparatus of claim 1, comprising the steps of:

aligning the optical axis of the telescope so it is directed at the same point as the laser beam on a target;
firing one round from the weapon to a target at a predetermined distance from the weapon; and
aligning the sight apparatus to the target by adjusting a base on which the apparatus is mounted to the weapon in order that the laser beam appears on the target.

* * * * *